March 25, 1952 — H. L. ROGERS — 2,590,210
DETACHABLE FLUID PRESSURE OPERATED GOOSENECK FOR TRAILERS
Filed Nov. 26, 1949 — 4 Sheets-Sheet 1

INVENTOR.
Hugh L. Rogers,
BY Geler & Leonard,
his ATTORNEYS.

INVENTOR.
Hugh L. Rogers,
BY
Geler + Leonard,
his ATTORNEYS.

Patented Mar. 25, 1952

2,590,210

UNITED STATES PATENT OFFICE 2,590,210

DETACHABLE FLUID PRESSURE OPERATED GOOSENECK FOR TRAILERS

Hugh L. Rogers, Albion, Pa., assignor to Rogers Brothers Corporation, Albion, Pa., a corporation of Pennsylvania Application November 26, 1949, Serial No. 129,614

25 Claims. (Cl. 214—85)

This invention relates to highway trailers and particularly to detachable goosenecks therefor.

In the presently used types of heavy duty trailers, the rear of the trailer body is supported on detachable wheel assemblies and the front end of the trailer is supported by a suitable upwardly and then forwardly extending gooseneck, the gooseneck carrying a downwardly exposed fifth wheel member so as to detachably support the front end of the trailer on a complementary upwardly exposed fifth wheel member on the rear of a tractor or front wheel assembly.

The body, or load supporting platform, of such trailers is maintained at as low a level as possible so as to lower the center of gravity of the heavy loads, to afford clearance beneath bridges and overhead obstructions across the highway, and to provide for convenience in loading. To maintain a low bed or platform, the wheels often are permitted to extend above the platform or body level. Such trailers generally are loaded from the rear. This necessitates moving the load over the wheels or removing the wheels. In loading over the wheels, suitable ramps are built with boards and blocking, and the load is moved up the ramp and over the wheels into loaded position onto the platform or trailer body. Since the loads, such as heavy power shovels, steam rollers and large construction equipment, often weigh many tons, seventy to one hundred tons being common, loading over the wheels by means of ramps is a very hazardous undertaking. A slight shift in the load may cause it to tip over or slide or skid off the ramps to one side. This hazard increases greatly as the height and gradient of the ramp are increased. Furthermore, the higher the ramp must be made, the longer it must be made to maintain a reasonable gradient.

Again, as the load passes over the peak of the ramp, which is at the top level of the wheels, and becomes overbalanced forwardly and rearwardly, the forward end of the load drops suddenly to platform level subjecting both the load and trailer to severe stresses and endangering the lives of the workmen.

In order to minimize such hazards of loading, the wheels of the trailers are kept as small as possible so as to reduce the gradient and height of the ramp.

Instead of using ramps of this nature, the rear wheel assemblies are removed so that the rear end of the trailer body rests on the ground. By this method of loading, only a limited height ramp is required. After loading, however, the rear end of the trailer must be raised by suitable jacks and the like and the wheel assemblies reattached. This operation with heavy loads is not only extremely hazardous but time consuming.

The present invention comprises generally a detachable gooseneck for trailers of the character described and complementary weight supporting detachable coupling members on the lower portion of the gooseneck and on the forward end of the trailer respectively, which, when the front end of the trailer is resting on the ground and the gooseneck is supported by the usual fifth wheel on a tractor or front wheel assembly, can be moved substantially into vertical alignment with each other merely by backing the gooseneck into position, and extensible compression members carried by the gooseneck and adapted by engagement with the ground to elevate the portion of the gooseneck carrying the coupling member so that the coupling member is moved into weight supporting relation to the coupling member on the trailer, then to lift the front end of the trailer into proper travelling position, and latching means movable into position to secure the coupled gooseneck and front end of the trailer in normal operating position.

Likewise, the gooseneck can readily be detached and removed from the trailer merely by operating the extensible compression members to lower the front end of the trailer and the portion of the gooseneck carrying the coupling member until the front end of the trailer rests upon the ground and then additionally lowering the gooseneck until the coupling members are detached from each other and the weight of the gooseneck is supported on the tractor or front wheel assembly clear of the ground, and then moving the gooseneck forwardly out of position. As a result, the trailer can be loaded over the front end with a very short ramp of very limited height. Furthermore, there is no rocking of the load forwardly and rearwardly as is the case when, in loading over the wheels, the center of gravity of the load passes the highest level of the wheels and the load overbalances and drops or rocks downwardly onto the trailer body.

Another feature of the invention resides in the connection of the gooseneck and trailer in such a manner that the gooseneck can be unlatched without detachment and tilted either forwardly or rearwardly with respect to the trailer body while its fifth wheel member is connected to that of the tractor or front wheel assembly, whereby the forward end of the trailer body can be lowered while moving the load under overhead obstructions or can be raised for affording greater road clearance when passing over abrupt changes in grade, such as over railroads and the like.

Due to the factors heretofore described, it is possible to use larger diameter wheels for the rear end of the trailer with the consequent advantage of larger diameter tires which heat much less rapidly than smaller diameter tires under heavy loads and relatively high speeds.

Specific objects and advantages of the invention will become apparent from the following description wherein reference is made to the drawings in which.

For the purposes of illustration the invention is described in connection with the usual girder or I-beam type of semi-trailer adapted to be supported at its front end on the rear of a tractor, its application to other types of trailers and those supported at the front on front wheel assemblies being readily apparent from the illustrative example.

In the form illustrated, the trailer comprises a pair of longitudinal weight supporting girders or sills 1 which are spaced apart equidistantly from the longitudinal median line of the trailer and which are connected together with suitable cross bracing, not illustrated, so as to provide a rigid body structure. Suitable lateral beams extending outboard of the sills and a suitable load bearing platform carried thereon and on the sills may be provided if desired. The rear end of the trailer is supported by suitable rear wheel assemblies, indicated at 2, which may be detachable. This construction is well known in the art.

The gooseneck of the present invention may comprise the usual rigid upright side members 3 spaced laterally of the trailer from each other and forwardly extending horizontal members 4 secured to the upper ends thereof. All of these members may be constructed in whole or part of suitable I-beams, or structural steel elements, or they may be fabricated of suitable plate steel portions welded together. Bridging between and connecting the upright members 3 and horizontal members 4 are suitable tie plates 5. These tie plates 5 preferably are welded at their edges to the edges of the top flanges of the members 4 and to the rear edges of the upright members 3, thus providing a transversely rigid structure. Suitable reinforcing gussets 6 may be provided between the forward portion of the upright members 3 and the horizontal members 4. The gooseneck thus fabricated is very rigid.

As best illustrated in Figs. 1 through 4, the forward end of the horizontal members 4 are beveled upwardly forwardly at their under surface, as indicated at 7, and skid plate 8 is secured thereto and bridges across between the members 4. The skid plate preferably extends toward the upright members 3 beyond the bevel 7 a sufficient distance to rest on and form the main bearing surface for cooperation with the usual upwardly exposed fifth wheel member 9. The usual king pin of the fifth wheel is carried on the gooseneck within the limits of the plate 8.

In the form illustrated, a conventional upwardly facing fifth wheel member 9 is shown as connected to the rear of a tractor 10 for rocking about a horizontal shaft 11 which extends transversely of the tractor 10. This fifth wheel structure is one which is conventional and well known in the art and receives the king pin from the rear while the plate and bearing surface of the member 9 are in contact and is provided with suitable latching means to latch the king pin in the central socket of the member 9.

Referring to the details of the detachable gooseneck structure, secured to the lower edges of the upright members 3, respectively, are sockets, indicated generally at 12. Since they are the same in form and function, one only need be described. Each socket 12 is in the form of a box which is open at the rear of the gooseneck and is partially open at the bottom. The socket 12 may be formed of a top plate 13 and side plates 14 and a front plate 15, all of which are secured together by welding. The plates 14 are divergent rearwardly of the gooseneck so as to form a guide for the forwardly extending ends of the sills 1.

Figures 9, 10, 11, 12, 13:
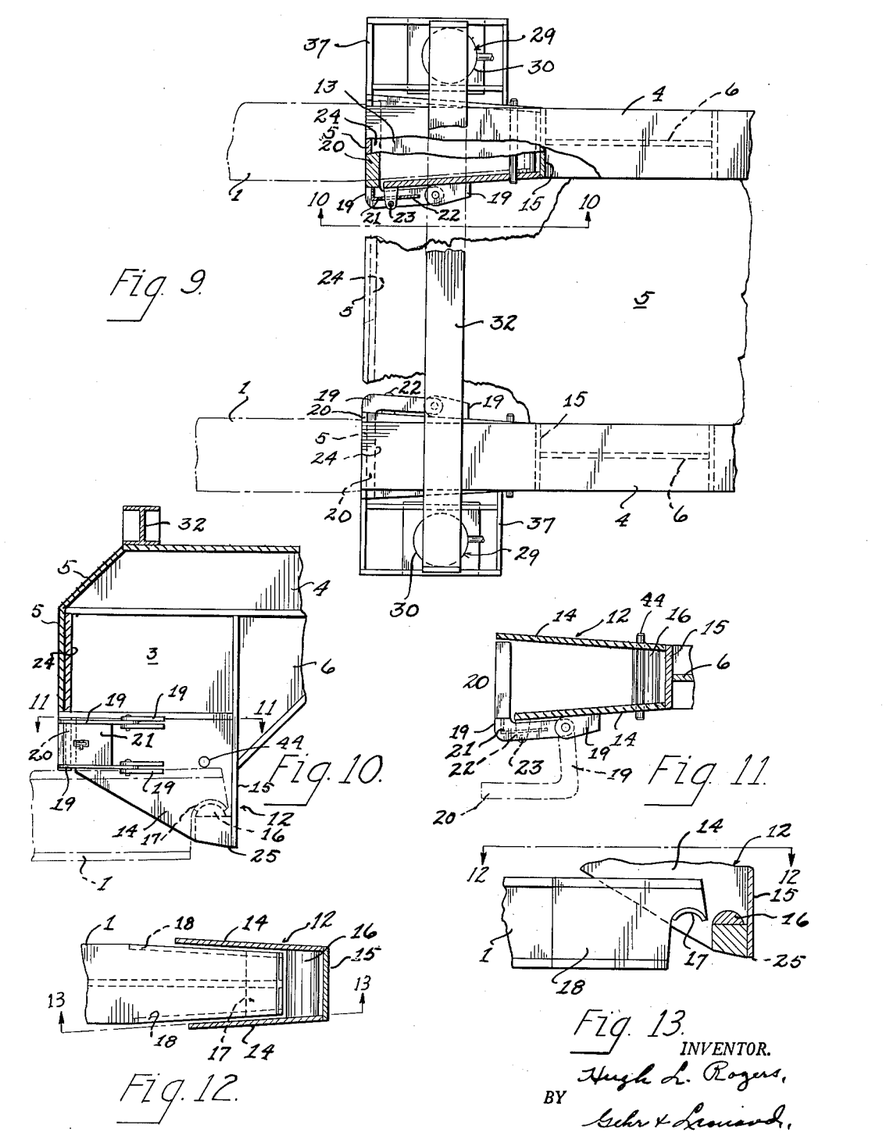
Fig. 9 is a fragmentary top plan view of the gooseneck illustrating the locking means for locking the gooseneck in normal coupled position.
Fig. 10 is a fragmentary vertical sectional view taken on the line 10—10 in Fig. 9, the position of the forward end of the trailer being indicated in broken lines.
Fig. 11 is a fragmentary horizontal sectional view taken on the line 11—11 of Fig. 10.
Fig. 12 is a fragmentary horizontal sectional view of a portion of the gooseneck and a portion of the front end of the trailer preparatory to their movement into alignment for coupling and is taken n the line 12—12 in Fig. 13.
Fig. 13 is a fragmentary vertical sectional view of the portion of the gooseneck and forward end of the trailer illustrated in Fig. 12 and is taken on line 13—13 of Fig. 12.

Fixedly secured to the lower portion of the plate 15, at the rear face thereof, is an upwardly facing weight supporting and coupling member 16, the upwardly facing surface of which is preferably a half cylinder. The coupling member 16 is co-extensive in width with the socket 12 and the semi-cylindrical portion thereof is spaced rearwardly a short distance from the plate 15, as best illustrated in Figs. 12 and 13. Each coupling member 16 is adapted to engage with complementary downwardly facing weight supporting and coupling member 17. The members 17 are mounted on the forward ends of the longitudinal sills 1, respectively. The forward end of each longitudinal sill 1 is tapered laterally inwardly toward the forward ends of the sills so as to be substantially complementary to the inner faces of the plates 14. Suitable side skid plates 18 are secured to the forward ends of the sills 1 to reinforce them and to guide them accurately into the open rear ends of the sockets 12.

Pivotally secured on the plates 14 for swinging movement about upright axes are suitable pairs of brackets 19, the brackets 19 extending rearwardly of the sockets 12. Connected to the rear ends of the pairs of brackets 19 are locking members or plates 20, respectively, these locking members extending at substantially right angles to the brackets so as to be positioned across the open rear ends of the sockets when in locking position but being adapted to be swung inwardly and forwardly of the trailer into a fully retracted or inoperative position.

In order to latch the locking member 20 in locking position, a suitable plate 21 is secured between each pair of brackets 19 and is provided with an aperture through which is received a tongue 22 carried on the plates 14. The tongue is arranged to extend through the plate 21 and therebeyond when the locking members 20 are in locking position. Each tongue 22 has a suitable aperture through which a cotter pin 23 is passed to latch the locking members in locking position.

The plate 5 heretofore described extends downwardly between the upright members 3 at the rear thereof and terminates at its lower edge at the level of the upper edge of the members 20 so as to permit the plates to swing into position beneath the lower end of the plate 5 with operating clearance when the gooseneck and the trailer body are moved almost into normal attached relation with respect to each other.

It is apparent that when the coupling members 16 of the gooseneck and 17 of the trailer are in the normal coupling relation and the members 20 are inserted between the lower edge of the plate 5 and the top of the sills 1, the gooseneck is secured against rocking rearwardly. On the other hand, if the members 20 are removed or swung out of locking position, the gooseneck can rock rearwardly about the coupling members 16 and 17 relative to the trailer. Even with the locking members 20 in locking position, the gooseneck can be rocked forwardly but the load on the trailer and the weight of the trailer and gooseneck are so great that such forward rocking movement of the gooseneck normally does not occur. Instead, one of the points of greatest stress is the compressive force on the locking members 20 exerted upwardly by the sills 1 and downwardly by the plate 5.

In order to develop the full bearing capacity on the upper edges of the locking members 20 an extra plate 24 may be secured to the inner face of the plate 5 and extend above the sockets for engagement with the upper edges of the members 20.

It is apparent that with the structure described, the gooseneck can be detached from the trailer body by swinging the plates 20 into an idle position from between the sills 1 and the plates 5 and 24, lowering the front end of the trailer by permitting the gooseneck to tilt rearwardly until the front end of the trailer rests upon the ground and then tilting the gooseneck still further rearwardly to lower the coupling members 16 below the coupling members 17.

Figure 7:
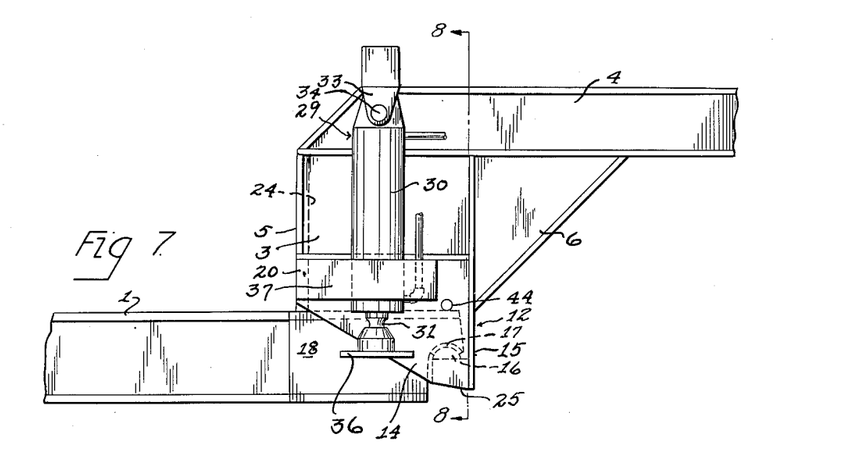
Fig. 7 is a view similar to Figs. 5 and 6 but showing the trailer and gooseneck in normal coupled position.
Figure 8:
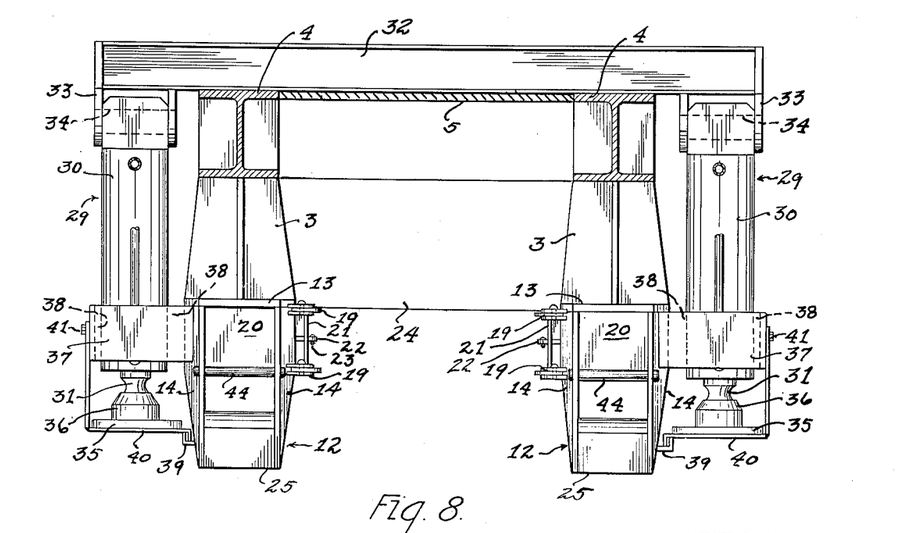
Fig. 8 is a slightly enlarged fragmentary sectional view of the detachable gooseneck taken on the line 8—8 in Fig. 7.

As best illustrated in Fig. 7, the lower edge of the gooseneck, indicated at 25, is positioned so that when the front end of the trailer rests on the ground and the coupling member 16 is lowered to clear the lowest portion of the coupling member 17 the edge 25 clears the ground and the gooseneck can be moved forwardly free of the trailer.

In order to prevent the gooseneck from striking the ground and to maintain it at the right elevation so that while the front end of the trailer is resting on the ground the gooseneck can be moved rearwardly and the coupling member 16 caused to pass beneath but clear of the coupling member 17, suitable pads 27 and 28 are provided on the underside of the forwardly extending members 4 and the upper faces of the sills of the tractor 10. As illustrated, these pads are so arranged that when the gooseneck has rocked downwardly about the shaft 11 of the fifth wheel until the pads are engaged with each other, the lower edge 25 of the gooseneck clears the ground and the highest point of the coupling member 16 clears the lowest point of the coupling member 17 of the trailer.

In order to manipulate the gooseneck and trailer for attachment and detachment and for positioning the gooseneck selectively in normal position and forwardly and rearwardly tilted positions with respect to the forward end of the trailer, suitable extensible compression members are provided.

In the form illustrated, these extensible compression members, indicated generally at 29, may comprise double acting hydraulic piston and cylinder assemblages, each assemblage having a cylinder 30 and piston 31. Preferably, the cylinders are mounted on the gooseneck at its upper portion, so as to depend therefrom, by means of a suitable transverse beam 32 provided on the top of the forwardly extending members 4. The beam 32 extends laterally of the gooseneck to and beyond the outboard limits of the members 4. Secured to the ends of the beam are suitable depending brackets 33 arranged in pairs, one pair at each end of the beam. The upper ends of the cylinders 30 are pivotally connected to the pairs of brackets 33, respectively, by pivots 34, for swinging movement forwardly and rearwardly of the gooseneck. Carried on each piston 31 is a suitable foot 35, the foot and piston being connected together by a suitable ball and socket joint 36, as best illustrated in Fig. 5, so that the foot can accommodate itself to the ground surface regardless of the angle at which the cylinder depends from the gooseneck.

Operating hydraulic pressure is supplied to the cylinders through the usual flexible hoses from the tractor or other suitable source and is supplied under the control of the usual reversing valve so that the pistons of the two cylinders can be moved concurrently upwardly and downwardly to extended and retracted positions, selectively.

Since, during part of the operation, the extensible compression members must support the weight of the loaded trailer and gooseneck, suitable thrust frames 37 are provided. The frames 37 are connected to the plates 14 at the outer faces thereof and surround the lower ends of the cylinders 30. The cylinders are provided with suitable slide plates 38 which engage the inner and outer faces of the inner and outer walls of the associated frames 37 so as to confine the cylinders for swinging forwardly and rearwardly in a vertical plane and so as to transfer any lateral thrusts imposed on the cylinders directly to the gooseneck and relieve the cylinders and pistons therefrom.

Figure 5:
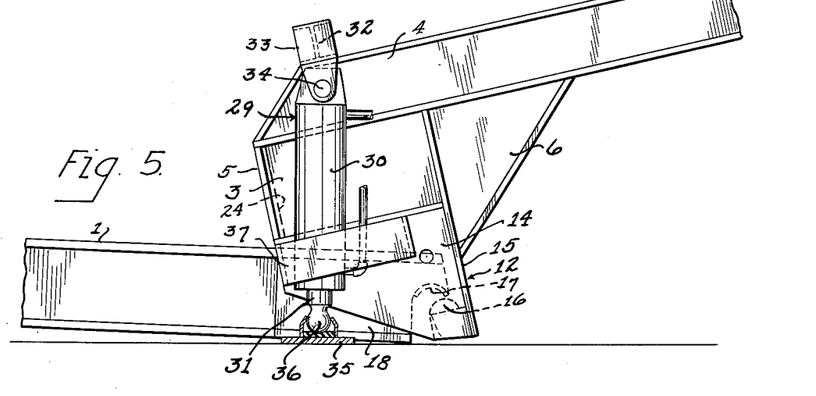
Fig. 5 is an enlarged fragmentary side elevation of a portion of a trailer and detachable gooseneck in position for coupling or for removal of the gooseneck.
Figure 6:
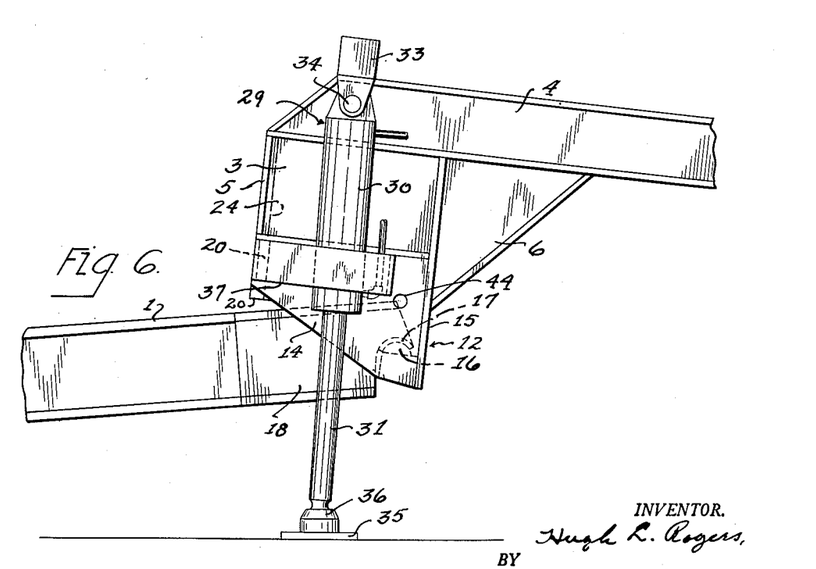
Fig. 6 is a view similar to Fig. 5 but showing the gooseneck elevated and the front end of the trailer supported thereon with the locking means moved into place.

Referring to Figs. 5 and 6, it is to be noted that the extensible compression members 29 are located toward the rear end of the gooseneck and preferably sufficiently far to the rear so that the line of thrust of the piston 31 and cylinder 30, when the foot 35 is engaged with the ground, is near to, and preferably at, or rearwardly from, the coupling members 16 and 17. As a result of the latter arrangement, the upward thrust of the extensible compression members on the rear of the gooseneck, when the members 16 and 17 are coupled, urges the forward portion of the gooseneck downwardly. This downward thrust of the forward portion of the gooseneck is resisted by a reactionary upward thrust of the fifth wheel member on the rear of the tractor, whereas if the line of thrust of the extensible compression members were a substantial distance forwardly of the coupling members 16 and 17, the downward thrust of the extensible compression members for lifting the forward end of the trailer body would urge the forward portion of the gooseneck upwardly, thus subjecting the fifth wheel members and rear of the tractor to stresses tending to pull them apart vertically and to lift the rear of the tractor by the fifth wheel members. These stresses would be severe were the extensible compression members very far forwardly from the coupling members 16 and 17.

In order to retain the pistons in fully retracted position, suitable brackets 39 are secured on the outer faces of the plates 14. Each of these brackets is engaged by the inner end of a stirrup 40 which extends beneath the foot 35 of its piston and is connected by a suitable bolt 41 to its associated frame 37.

It will be noted that the forward ends of the sills 1 are bevelled rearwardly, as indicated at 42, from the forward edge of the coupling members 17 upwardly to compensate for arcuate travel of the sills and rearward tilt of the gooseneck while the members 16 and 17 are engaged and the forward faces of the sills are bevelled downwardly and rearwardly, from the lower edges of the members 17 as indicated at 43, to provide clearance for the forward tilt of the gooseneck while the members 16 and 17 are engaged.

Figure 1:
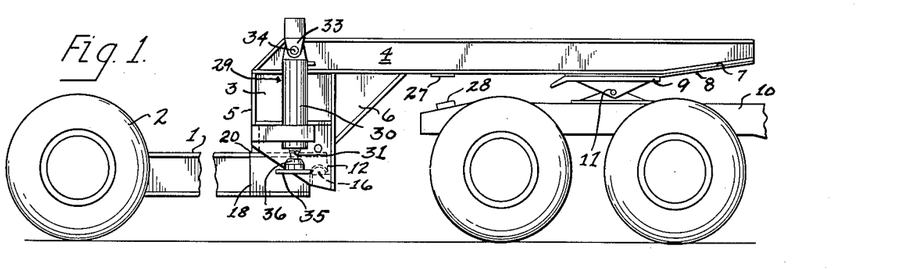
Fig. 1 is a fragmentary side elevation of a trailer, embodying the present invention, and a tractor coupled for operation.

The operation of the apparatus is best illustrated in Figs. 1 through 6. In Fig. 1, the tractor 10 and the trailer are shown in their normal coupled relation for travel with the gooseneck in its normal attached and operating relation to the trailer. In this condition the forwardly extending members are generally horizontal, and the front or forward ends of the sills 1 are accommodated in the sockets 12 with the coupling members 17 resting on the upper surfaces of the coupling members 16 of the gooseneck. The locking plates or members 20 are under compression between the forward end portions of the top of the sills 1 and the lower edges of the plates 5 and 24. In this condition, there is no relative movement between the forward end of the trailer and the gooseneck. The pistons are in retracted condition and clear of the ground.

Figure 2:
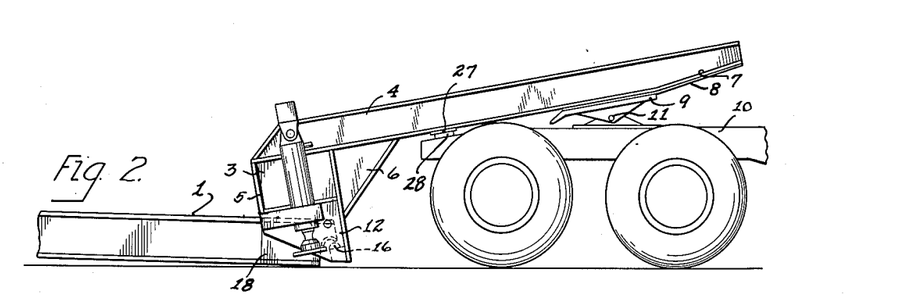
Fig. 2 is a view similar to Fig. 1 showing the trailer and detachable gooseneck in position for coupling or uncoupling.

In Fig. 2 the front end of the trailer is resting on the ground and the coupling members 16 and 17 are disengaged, the gooseneck is tilted rearwardly about the shaft 11 of the fifth wheel and its weight is being supported by the pads 27 and 28. The member 16 is positioned to clear the lowest part of the member 17. In this position the gooseneck may be attached by tilting it forwardly about the shaft 11 or it may be moved forwardly clear of the trailer and ground with its weight supported on the tractor.

As best illustrated in Figs. 5 and 6, assuming that the gooseneck is to be moved into position for attachment, the tractor is backed up until the peak of the semi-cylindrical portion of the coupling member 16 has passed rearwardly of the trailer beyond the forward edge of the coupling member 17. In this position, the piston and cylinder assemblages are released so as to depend vertically from the pivot 34 and the pistons are extended sufficiently to place the foot 35 on the ground directly beneath the pivot 34. Hydraulic fluid is then admitted to the upper end of the cylinder, thus swinging the gooseneck upwardly about the axis of the fifth wheel shaft 11 causing the coupling members 16 to engage the coupling member 17 and seat therein and to elevate the forward end of the trailer until it is lifted slightly above its normal position as illustrated in Fig. 6. When thus lifted, the locking members 20 are swung into locking position between the sills 1 and the plates 5 and 24 and latched in such position by the cotter pins 23. When the locking members 20 are thus latched in position, the pressure in the cylinder is relieved gradually, permitting the gooseneck to swing downwardly about the fifth wheel shaft 11 until the locking members 20 have engaged the top of the sills 1. Thereupon the gooseneck and trailer are coupled and the cylinders then arre fully retracted and secured in retracted condition by the stirrups 40.

To detach the gooseneck, the cylinder assemblages 29 are operated to move the gooseneck and front end of the trailer to the relative position shown in Fig. 6, whereupon the locking members 29 are removed from locking position and the assemblages 29 are then operated to lower the front end of the trailer and the gooseneck to the position illustrated in Fig. 5.

If desired, a suitable locking pin 44 may be provided in each socket 12 in position to engage the upper surface of the sills 1 and prevent their being lifted off the coupling members 16 when the gooseneck and trailer are in their normal attached condition. However, such pin is not necessary.

Figure 3:
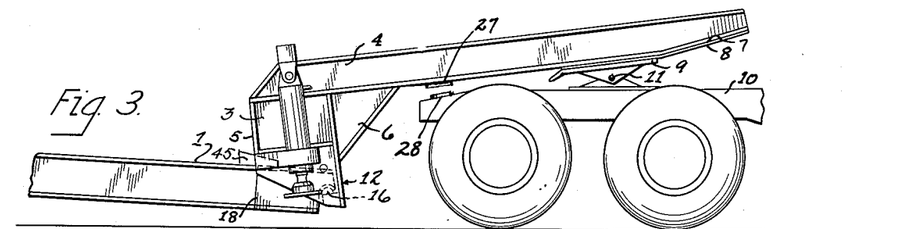
Figs. 3 and 4 are views similar to Fig. 1 with the trailer and detachable gooseneck coupled but with the gooseneck tilted rearwardly and forwardly respectively.

As mentioned, it is sometimes desirable to lower the trailer to clear overhead obstructions such as bridges and the like. In order to obtain this lowering of the trailer, the piston and cylinder assemblages are operated to elevate the gooseneck sufficiently to permit removal of the locking members 20. The members 20 are removed from locking position, and suitable rigid blocks 45 of wood or metal of the desired height are interposed between the tops of the forward ends of the sills 1 beneath the under edges of the plates 5 and 24 where the under edges of the plates extend across the top of the sockets at the rear of the latter. The assemblages 29 then are operated to permit the gooseneck to tilt rearwardly until the plates 5 and 24 engage the tops of the blocks 45, and are arrested in their downward movement thereby, as illustrated in Fig. 3. This operation lowers the forward end of the trailer body to the desired position but suspends it clear of the ground at the desired height. Since the loads are moved very slowly under such conditions the weight of the trailer and load is sufficient to keep the coupling members 16 and 17 in engagement while exerting the necessary pull on the trailer for moving it beyond the overhead obstruction after which the gooseneck and trailer are reattached and locked in normal position.

Figure 4:
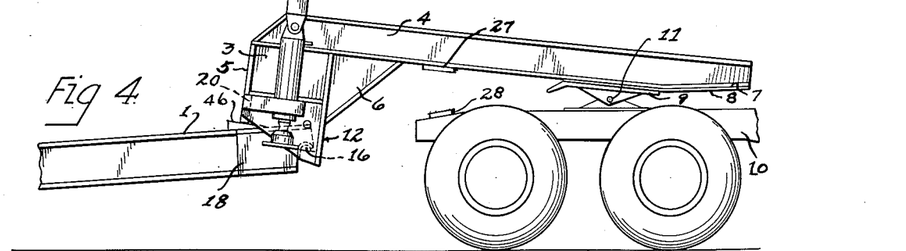

On the other hand, where greater road clearance is desired, the piston and cylinder assemblages 29 can be operated to rock the gooseneck forwardly about the shaft 11 and elevate the front end of the trailer body to a position such as illustrated in Fig. 4, the plates or members 20 remaining in position on the gooseneck. When in this position, blocks 46 of the desired height may be interposed between the tops of the sills 1 and the lower edges of the locking plates 20 for maintaining the gooseneck in this position until the trailer has been moved beyond the surface obstruction on the road after which the piston and cylinder assemblages are operated to tilt the gooseneck forwardly, the blocks 46 are removed, and the gooseneck then is lowered to normal position, whereupon the locking plates or members 20, which have been left in locking position, again engage the sills 1.

In Figs. 1 through 4 it is noted that the piston and cylinder assemblages 29 are shown as maintaining their alignment with the gooseneck. In these figures it is considered that the pistons have been retracted and secured in their retracted condition by their stirrups 40 but the stirrups have been omitted in Figs. 1 through 4 for clearness in illustration. Actually the assemblages 29 when not latched by their stirrups swing freely and depend vertically from their pivots 34 so as to engage the ground directly beneath the pivotal axis.

Having thus described my invention, I claim:

1. A trailer including a body and wheel assemblages supporting the rear end of the body, a gooseneck detachably connected at its lower portion to the forward end of the body, power operable extensible compression means carried by and depending from the gooseneck and operable to engage a supporting surface therebeneath at its lower end and selectively elevate and lower the gooseneck and thereby the forward end of the body when the body is coupled thereto and supported thereby, weight supporting complementary coupling means on the lower rear portion of the gooseneck and forward end of the body, respectively, and engageable with each other in coupling relation by predetermined movement of the gooseneck in a predominantly upright path toward said forward end of the body while the coupling means are approximately aligned along said path and the body and gooseneck remain in substantially fixed position relative to each other longitudinally of the body, and locking means for locking the coupling means in coupling relation and for unlocking the coupling means for detachment from each other selectively.

2. A trailer according to claim 1 characterized in that the coupling means on the body are downwardly facing and spaced above the ground level when the forward end of the body is supported on the ground level and the coupling means on the gooseneck are upwardly facing and adapted to be positioned to lie in spaced relation below the level of the coupling means on the body while the lower limit of the gooseneck is above the level of the ground when the forward end of the body is supported on ground level, whereby the coupling means can be engaged and coupled by upward movement of the gooseneck.

3. A trailer according to claim 2 further characterized in that said coupling means have an axis extending transversely of the body and couple the body and gooseneck for rocking about said axis, and that said locking means comprises a rigid abutment member carried by the gooseneck rearwardly from its coupling means in overhanging spaced relation to the forward end of the body so that, by insertion of a compression member between the abutment member and forward portion of the body while the gooseneck is rocked forwardly slightly beyond normal position and the coupling means are in coupling relation, the gooseneck can be constrained from rocking in the opposite direction beyond said normal position.

4. A heavy duty trailer comprising a supporting body, wheel assemblies supporting the rear end of the body, a gooseneck including an upright portion extending upwardly from the front end of the body and a forward portion extending forwardly from the upper part of the upright portion and adapted to support at its under side a fifth wheel member, an upwardly facing coupling member carried by and near the bottom of the upright portion and accessible from the rear of said upright portion from above the coupling, a cooperating downwardly facing coupling member on the forward end of the body and received on the first coupling member by movement of the body and gooseneck relatively toward each other in a generally upright path when the coupling members are substantially aligned vertically, power operated longitudinal expansible compression means depending from the gooseneck and operable to engage a supporting surface therebeneath at its lower end and elevate and depress the portion of the gooseneck carrying said complementary coupling member, selectively, into and out of engagement with the first coupling member, and to elevate and depress the forward end of the body by the gooseneck when the body is connected to the gooseneck and locking means adapted to be operatively interposed between the gooseneck and body to prevent downward movement of said portion of the gooseneck relative to the front end of the body.

5. In a trailer including a body and wheel assemblages supporting the rear of the body, said body comprising laterally spaced longitudinal sills, a gooseneck for the forward end of the body, coupling means carried by the lower portion of the gooseneck, and having upwardly exposed cylindrical surfaces with a common axis extending transversely of the body, said surfaces being accessible from above by the forward ends of the sills, complementary coupling means carried by the forward end of the sills and facing downwardly in position to be engaged by the first coupling members by upward movement of the first coupling members from a position therebeneath and when engaged, to couple the body and gooseneck for relative rocking about said axis, a rigid member carried by the gooseneck and terminating downwardly in spaced relation above said sills rearwardly from the coupling means, means selectively interposable between and removable from between said rigid member and sills for transmitting compressive thrusts therebetween, and power operated extensible and contractible compression means carried by the gooseneck and operable to engage the ground and lift and lower the gooseneck, selectively, and to lift and lower the forward end of the body by the gooseneck when the sills are connected to the gooseneck.

6. In a trailer including a body and wheel assemblages supporting the rear end of the body, a rigid gooseneck having a generally upright portion and a generally forwardly extending portion, coupling members carried by the upright portion and each having an upwardly exposed surface curved about an axis extending transversely of the gooseneck, cooperating complementary coupling members carried by the forward end of the body and having a downwardly exposed surface complementary to said upwardly exposed surface, and removable therefrom by movement of the gooseneck in a generally upright path downwardly relative to the body, said coupling members on the gooseneck, when engaged with the coupling members on the body, connecting the gooseneck and body for relative rocking movement about said axis, locking means on the gooseneck in spaced relation above the forward end of the body rearwardly from said axis, and compression means selectively interposable between, and removable from between, the said locking means and forward end of the body when the body and gooseneck are in one relatively rocked position and operative when so interposed to limit the rearward rocking of the gooseneck about said axis.

7. A trailer including a body and having rear wheel assemblies, forwardly projecting members rigid with the body, coupling members on the forward ends of the forwardly projecting members, a rigid gooseneck, rearwardly open sockets carried thereby for reception of the forwardly projecting members endwise and for accommodating said members for limited vertical movement, cooperating complementary coupling members in the sockets and engageable with the first coupling members by movement generally vertically toward the first coupling members while the forwardly projecting members are in the sockets, said complementary coupling members being adapted when engaged to prevent removal of the forwardly projecting members endwise from the sockets, means at the rear of the sockets and rigid with the gooseneck and in overhanging spaced relation to the forwardly projecting means when the latter are in the sockets, rigid locking members movable into the rear of the sockets between the forwardly projecting means and said overhanging means for securing the forwardly projecting means from vertical movement in a direction to separate the complementary coupling members.

8. In a tractor-trailer combination including a trailer having a body and rear supporting wheel assemblies and a tractor having an upwardly exposed fifth wheel member rockable about a horizontal axis extending transversely of the tractor, a detachable gooseneck on the forward end of the body and having an upright portion extending upwardly from the body and a forward portion extending from the upright portion and connected to said fifth wheel for rocking about said axis, expansible and contractible compression means connected to the gooseneck and operable to engage a supporting surface and rock the gooseneck upwardly and downwardly about said fifth wheel axis from a normal operating position to positions above and below normal operating position and to lift and lower the forward end of the body by the gooseneck when the body is connected to the gooseneck, cooperating means on the tractor and gooseneck for arresting downward rocking movement of the gooseneck in a final downward position wherein it is clear of the ground, an upwardly facing coupling member on the lower portion of the upright portion of the gooseneck and accessible from the rear of the gooseneck and from the top of the coupling member, a downwardly facing complementary coupling member on the forward end of the body in position to lie in spaced relation above the level of the coupling member on the gooseneck when the forward end of the body is resting on the ground and the gooseneck is supported in said final downward position by the tractor, compression resisting means on the gooseneck positioned rearwardly from the coupling member of the gooseneck and in overhanging spaced relation to the forward portion of the body when the gooseneck and body are in normal traveling position, movable compression resisting means operatively interposable in a locking position between the top of the forward portion of the body and the bottom of the first compression resisting means when the gooseneck and body are in said normal position for arresting rocking of the gooseneck downwardly about said fifth wheel axis, and means supporting said movable compression resisting means for movement into and out of said locking position.

9. The combination according to claim 8 further characterized in that additional compression resisting means are provided which are selectively operatively interposable between the gooseneck and forward portion of the body to support said gooseneck in rocked positions above and below the normal operating position.

10. A trailer including a body and wheels supporting the rear end of the body, a rigid gooseneck for the forward portion of the body and having an upper portion adapted to be supported on, and tractively connected to, a tractor, and having a lower rear portion adapted to occupy a position to the rear of the tractor when the forward portion of the gooseneck is so supported, weight supporting means on the lower rear portion of the gooseneck and on the forward portion of the body, respectively, and engageable with each other when the body and gooseneck are below normal load carrying position, and operable when so engaged to lift the forward portion of the body to normal load carrying position by the gooseneck upon predetermined upward movement of the rear portion of the gooseneck in a substantially upright path and to lower the forward portion of the body by the gooseneck from normal load carrying position upon predetermined downward movement of the rear portion of the gooseneck in said path, means to tractively couple the gooseneck to the body, power operable extensible compression means connected to and carried by the gooseneck and adapted to engage the ground therebeneath at the lower end and operable, when so engaged, to effect said predetermined upward and downward movements and to lift and lower the forward portion of the body by the gooseneck when it is connected to the gooseneck, means to lock the gooseneck and body in said normal load carrying position when coupled.

11. A trailer according to claim 10 characterized in that said extensible compression means comprises at least one reversible hydraulic piston and cylinder assemblage.

12. A trailer according to claim 10 characterized in that said extensible compression means comprises reversible hydraulic piston and cylinder assemblages which are carried by the gooseneck near opposite sides of the gooseneck, respectively.

13. A trailer according to claim 10 characterized in that said extensible compression means are positioned so that the said upward and downward line of thrust is located at least about as far to the rear of the gooseneck as the said weight supporting means.

14. A trailer according to claim 10 characterized in that said expansible compression means is so positioned that its upward and downward line of thrust is located rearwardly from the weight supporting means of the gooseneck.

15. A trailer including a body and wheels supporting the rear end of the body, a rigid gooseneck for the forward portion of the body and having an upper portion adapted to be supported on, and tractively connected to, a tractor, and having a lower rear portion adapted to occupy a position to the rear of the tractor when the forward portion of the gooseneck is so supported, weight supporting coupling means on said lower rear portion of the gooseneck and on the forward portion of the body, respectively, and adapted to be substantially aligned vertically while out of contact with each other by relative movement of the gooseneck and body endwise of the body while the forward portion of the body and the rear portion of the gooseneck are below their normal load carrying positions, respectively, said coupling means being operable, when so aligned, to engage and couple the gooseneck and body and lift the forward portion of the body by the gooseneck upon predetermined upward movement of the rear portion of the gooseneck along a generally upright path, and to lower the forward portion of the body by the gooseneck and uncouple and disengage the body and gooseneck upon predetermined downward movement of the rear portion of the gooseneck along said path, and power operable extensible compression means connected to and carried by the gooseneck and adapted to engage the ground therebeneath at the lower end and operable, when so engaged, to effect said predetermined upward and downward movements of the gooseneck, and of the forward portion of the body when the body and gooseneck are coupled, and means to lock the gooseneck in said normal load carrying position when coupled.

16. A trailer including a body and wheels supporting the rear end of the body, a rigid gooseneck for the forward portion of the body and having an upper portion adapted to be supported on, and tractively connected to, a tractor, and having a lower rear portion adapted to occupy a position to the rear of the tractor when the forward portion of the gooseneck is so supported, weight supporting coupling means on said rear portion of the gooseneck and on the forward portion of the body, respectively, and adapted to be detachably connected both for relative rocking movement about an axis extending transversely of the body and for traction while the forward portion of the body and rear portion of the gooseneck are below the normal load carrying position of the trailer while the gooseneck and body remain in substantially fixed position relative to each other endwise of the body, and, when connected, being operable to raise and lower the forward portion of the body by predetermined upward and downward movements, respectively, of the rear portion of the gooseneck, power operable extensible compression means connected to and carried by the gooseneck and adapted to engage the ground therebeneath at the lower end and operable, when so engaged, to effect said predetermined upward and downward movements of the gooseneck, and of the forward end of the body and gooseneck when they are connected, and means to lock the gooseneck and body in said normal load carrying position when coupled.

17. A trailer according to claim 16 characterized in that said gooseneck and body have locking portions, respectively, spaced from said transverse axis and movable toward and away from each other consequent upon relative rocking of the coupled gooseneck and forward portion of the body about said transverse axis, removable latch means are provided and are connectible with said locking portions when the gooseneck and body are in a predetermined rocked position relative to each other in which they are above their lowermost coupled position and are operable, when so connected, to constrain the locking portions from movement in the direction occasioned by relative rocking of the gooseneck and forward portion of the body toward their lowermost coupled position.

18. A trailer according to claim 16 characterized in that said gooseneck and body have locking portions, respectively, spaced from said transverse axis and movable toward and away from each other consequent upon relative rocking of the coupled gooseneck and forward portion of the body in opposite directions, respectively, about said transverse axis, removable latch means are provided and are connectible with said locking portions when the gooseneck and body are in a predetermined rocked position relative to each other in which they are above their lowermost coupled position, and are operable, when so connected, to constrain the locking portions from movement in the direction occasioned by relative rocking of the gooseneck and forward portion of the body toward their lowermost coupled position, and further characterized in that the removable latch means are adjustable in dimension in the direction of movement of the said locking portions so that the locking portions can be so constrained, selectively, in a plurality of different rocked positions of the gooseneck and body.

19. A trailer according to claim 16 characterized in that said gooseneck and body have locking portions, respectively, spaced from said transverse axis and movable toward each other consequent upon relative rocking of the gooseneck and body toward their lowermost coupled position and away from each other consequent upon relative rocking movement of the gooseneck and body away from their lowermost coupled position, and compression resistant means are provided and are interposable between said locking portions when the gooseneck and body are in a predetermined rocked position about said axis above their lowermost position, and are operable, when so interposed, to constrain the locking portions from movement toward each other.

20. A trailer according to claim 16 characterized in that said expansible compression means are so positioned that its upward and downward line of thrust is located at least about as far to the rear of the gooseneck as the coupling means of the gooseneck.

21. A trailer including a body and wheels supporting the rear end the body, a rigid gooseneck for the forward portion of the body and having an upper portion adapted to be supported on, and tractively connected to, a tractor, and having a lower rear portion adapted to occupy a position to the rear of the tractor when the forward portion of the gooseneck is so supported, weight supporting coupling means on said rear portion of the gooseneck and on the forward portion of the body, respectively, and adapted to be aligned generally vertically in spaced relation to each other by relative movement of the gooseneck and body endwise of the body while the forward portion of the body and the rear portion of the gooseneck are below their normal load carrying positions, respectively, said coupling means, when so aligned, being movable into and out of positions for coupling, respectively, by predetermined movements along a generally upright path, and being operable when coupled, to elevate the forward portion of the body by upward movement of the coupling means of the gooseneck along said path, power operable extensible compression means connected to and carried by the gooseneck and adapted to engage the ground therebeneath at the lower end and operable, when so engaged, to effect said predetermined upward and downward movements of the gooseneck, and of the body by the gooseneck when they are coupled, and means to lock the gooseneck and body in said normal load carrying position when coupled.

22. A rigid frame having an upper forward portion adapted to be connected to and supported by the rear of a tractor for rocking about a transverse axis and having a rear portion depending therefrom, weight supporting means on the rear portion adapted for connection to an extraneous load, power operable extensible compression means having at its lower end a ground engaging portion and connected to the frame and depending therefrom so as to be operable to engage the ground and raise and lower the rear portion of the frame, selectively, and said extensible compression means being positioned rearwardly of the frame and so that its line of thrust, when engaged with the ground, is near to the weight supporting means.

23. In a combination comprising a tractor, a fifth wheel member carried thereby, a rigid frame having a forward portion and a rear portion, a fifth wheel member on the forward portion and connected to the fifth wheel member of the tractor and thereby supporting the said forward portion, one of said members being rockable about an axis extending transversely of the tractor, the improvement comprising weight supporting means on said rear portion and adapted for connection to a load for raising and lowering the load by upward and downward movement, respectively, of the weight supporting means, power operable extensible compression means having at the lower end a ground engaging portion and connected to the frame and depending therefrom so as to be operable to engage the ground therebeneath and raise and lower the rear portion of the frame by rocking the frame about said axis while the tractor is in fixed position, and said extensible compression means being positioned rearwardly of the frame so that its line of thrust, when engaged with the ground, is rearwardly from the weight supporting means.

24. A trailer including a body and wheels supporting the rear end of the body, a rigid gooseneck for the forward portion of the body and having an upper portion adapted to be supported on, and tractively connected to, a tractor, and having a lower rear portion adapted to occupy a position to the rear of the tractor when the forward portion of the gooseneck is so supported, weight supporting coupling means on said rear portion of the gooseneck and on the forward portion of the body, respectively, and adapted to be detachably connected for relative rocking movement about an axis extending transversely of the body while the forward portion of the body and rear portion of the gooseneck are below the normal load carrying position of the trailer and, when connected, to raise and lower the forward portion of the body by predetermined upward and downward movements, respectively, of the rear portion of the gooseneck, power operable extensible compression means connected to and carried by the gooseneck and adapted to engage the ground therebeneath at the lower end and operable, when so engaged, to effect said predetermined upward and downward movements of the gooseneck, and of the forward portion of the body by the gooseneck when the gooseneck and body are connected, and means to lock the gooseneck and body in a plurality of relatively rocked positions, selectively, about said transverse axis.

25. A gooseneck adapted to be tractively connected and supported by the rear of a tractor, a trailer body, wheels on the body spaced from the forward end thereof, means for detachably tractively connecting the gooseneck and forward portion of the body when the front of the body is in a position below normal load carrying position, power operable extensible compression means on the gooseneck and having a portion adapted to engage the ground and raise the gooseneck and thereby the connected forward end of the body from said position to normal load carrying position, and means to lock the gooseneck and connected body in said normal load carrying position.

HUGH L. ROGERS.

REFERENCES CITED

The following references are of record in the file of this patent:

UNITED STATES PATENTS

| Number | Name | Date |
|---|---|---|
| 2,325,869 | Mosling | Aug. 3, 1943 |
| 2,389,211 | Pointer | Nov. 20, 1945 |
| 2,431,436 | Townsend | Nov. 25, 1947 |
| 2,449,947 | Meadows | Sept. 21, 1948 |
| 2,489,112 | Talbert | Nov. 22, 1949 |
| 2,530,866 | Evans et al. | Nov. 21, 1950 |

FOREIGN PATENTS

| Number | Country | Date |
|---|---|---|
| 544,160 | Germany | Feb. 15, 1932 |